(12) United States Patent
Weeber et al.

(10) Patent No.: US 8,875,380 B2
(45) Date of Patent: Nov. 4, 2014

(54) PROCESS OF FORMING AN ENCAPSULATED MAGNET ASSEMBLY

(75) Inventors: Konrad Roman Weeber, Rexford, NY (US); Jeremy Daniel Van Dam, West Coxsackie, NY (US); Mohamed Ahmed Ali, Katy, TX (US)

(73) Assignee: General Electric Company, Niskayuna, NY (US)

( * ) Notice: Subject to any disclaimer, the term of this patent is extended or adjusted under 35 U.S.C. 154(b) by 873 days.

(21) Appl. No.: 12/940,524

(22) Filed: Nov. 5, 2010

(65) Prior Publication Data

US 2011/0049109 A1 Mar. 3, 2011

Related U.S. Application Data

(63) Continuation-in-part of application No. 11/934,396, filed on Nov. 2, 2007, now Pat. No. 7,847,454.

(60) Provisional application No. 60/905,710, filed on Mar. 8, 2007.

(51) Int. Cl.
*H02K 15/00* (2006.01)
*F16C 32/04* (2006.01)
(Continued)

(52) U.S. Cl.
CPC .............. *F16C 32/047* (2013.01); *C22C 19/055* (2013.01); *C22C 19/07* (2013.01); *C22C*
(Continued)

(58) Field of Classification Search
CPC ... H02K 15/03; H02K 1/278; H02K 11/0089; H02K 2211/03; H01F 41/0253; H01F 7/0221

USPC .......... 29/596–598, 732, 592.1; 310/88, 90.5, 310/216.136

See application file for complete search history.

(56) References Cited

U.S. PATENT DOCUMENTS 4,492,889 A * 1/1985 Fukushi et al. ................. 29/596
4,816,708 A 3/1989 Laumond
(Continued)

FOREIGN PATENT DOCUMENTS

WO     WO9535447     12/1995

OTHER PUBLICATIONS

Web page entitled Sulfide Stress Cracking—NACA MR 0175), by Emerson Process Management, Engineered Pressure and Flow Control Solutions, www.emersonprocess.com/regulators, 10 pages.

(Continued)

*Primary Examiner* — Minh Trinh
(74) *Attorney, Agent, or Firm* — Andrew J. Caruso

(57) ABSTRACT

A process of forming an encapsulated magnet assembly is provided, the process comprising welding a second portion of a housing cover formed of a non-magnetic material to a first portion of a housing cover formed of a magnetic material to provide a welded housing cover and subsequently heat-treating the welded housing cover at a temperature effective to relieve weld stress; disposing a magnet within a housing comprising at least one wall formed of the non-magnetic material and defining at least one aperture; and welding the heat treated welded housing cover to the housing such that the second portion of the housing cover is fixedly attached to the housing wall to hermetically seal the aperture. In one embodiment, the magnet of the encapsulated magnet assembly is a permanent magnet, and in an alternate embodiment an electromagnet. In one embodiment the encapsulated magnet assembly is a component of a stator-rotor assembly.

10 Claims, 5 Drawing Sheets

(51) Int. Cl.
*C22C 19/05* (2006.01)
*C22C 19/07* (2006.01)
*C22C 38/00* (2006.01)
*C22C 38/22* (2006.01)
*C22C 38/40* (2006.01)
*C22C 38/42* (2006.01)
*C22C 38/48* (2006.01)
*C23C 30/00* (2006.01)
*F16C 35/00* (2006.01)
*H01F 7/02* (2006.01)
*H01F 7/20* (2006.01)
*H02K 7/09* (2006.01)
*H02K 5/173* (2006.01)
*H02K 15/12* (2006.01)

(52) U.S. Cl.
CPC ...... 38/001 (2013.01); *C22C 38/22* (2013.01); *C22C 38/40* (2013.01); *C22C 38/42* (2013.01); *C22C 38/48* (2013.01); *C23C 30/00* (2013.01); *F16C 32/0468* (2013.01); *F16C 35/00* (2013.01); *H01F 7/0221* (2013.01); *H01F 7/20* (2013.01); *H02K 7/09* (2013.01); *F16C 2240/40* (2013.01); *F16C 2300/42* (2013.01); *H02K 5/1732* (2013.01); *H02K 15/12* (2013.01); *F16C 2204/52* (2013.01)
USPC .............. 29/596; 29/598; 29/592.1; 310/90.5

(56) References Cited

U.S. PATENT DOCUMENTS

| | | | | |
|---|---|---|---|---|
| 6,007,312 | A * | 12/1999 | Pieters et al. | 29/607 |
| 6,069,421 | A * | 5/2000 | Smith et al. | 310/43 |
| 6,198,803 | B1 | 3/2001 | Osama et al. | |
| 6,310,414 | B1 | 10/2001 | Agahi et al. | |
| 6,553,773 | B2 | 4/2003 | Laskaris | |
| 6,648,167 | B1 | 11/2003 | Brupbacher et al. | |
| 6,712,912 | B2 | 3/2004 | Richards et al. | |
| 7,847,454 | B2 * | 12/2010 | Weeber et al. | 310/90.5 |
| 7,985,363 | B2 * | 7/2011 | Somple et al. | 264/263 |
| 2005/0034295 | A1 | 2/2005 | Meacham et al. | |
| 2006/0193733 | A1 | 8/2006 | Kume et al. | |
| 2007/0200443 | A1 | 8/2007 | Baudelocque et al. | |
| 2008/0218015 | A1 | 9/2008 | Weeber et al. | |
| 2008/0219834 | A1 * | 9/2008 | Merfeld et al. | 415/163 |

OTHER PUBLICATIONS

Web page entitled "Metal Coatings Corporation", by Metal Coatings COrporation, www.metcoat.com, 18 pages.
Web page entitled 17-4 Stainless Steel Bar (Stainless Steel 630), www.nationalspecialty.com/stainlesssteel174.php, 3 pages.
State Intellectual Property Office, P.R. China, English Translation of First Office Action issued on Jul. 30, 2010, 6 pages.

* cited by examiner

PROCESS OF FORMING AN ENCAPSULATED MAGNET ASSEMBLY

CROSS REFERENCE TO RELATED APPLICATIONS

This application is a Continuation-In-Part of and claims the benefit of U.S. patent application Ser. No. 11/934,396 filed Nov. 2, 2007 which in turn claims the benefit U.S. Provisional Patent Application No. 60/905,710, filed on Mar. 8, 2007, and entitled "Magnetic Bearings For Use In Corrosive Environments", each of which is incorporated by reference herein in its entirety.

BACKGROUND OF THE INVENTION

This disclosure relates to rotor and stator assemblies that utilize magnetic bearings and can be used in corrosive environments and processes of assembling the magnetic bearings. The rotor and stator assemblies can be used in turboexpanders, pumps, compressors, electric motors and generators, and similar turbo-machinery for the oil and gas industry.

A turboexpander is an apparatus that reduces the pressure of a feed gas stream. In so doing, useful work may be extracted during the pressure reduction. Furthermore, an effluent stream may also be produced from the turboexpander. This effluent stream may then be passed through a separator or a distillation column to separate the effluent into a heavy liquid stream. Turboexpanders utilize rotating equipment, which is relatively expensive and typically includes a radial inflow turbine rotor mounted within a housing having a radial inlet and an axial outlet. The turbine rotor is rotatably mounted within bearings through a shaft fixed to the rotor. Such turboexpanders may be used with a wide variety of different gas streams for such things as air separation, natural gas processing and transmission, recovery of pressure letdown energy from an expansion process, thermal energy recovery from the waste heat of associated processes, and the like. Compressors can be associated with turboexpanders as a means to derive work or simply dissipate energy from the turboexpander.

There are three primary types of bearings that may be used to support the rotor shaft in turbomachinery such as the turboexpander or compressor noted above. The various types of bearings include magnetic bearings, roller-element bearings, and fluid-film bearings. A magnetic bearing positions and supports a moving shaft using electromagnetic forces. The shaft may be spinning (rotation) or reciprocating (linear translation). In contrast, fluid-film and roller-element bearings are in direct contact with the rotor shaft and typically require a fluid based lubricant, such as oil.

Magnetic bearings provide superior performance over fluid film bearings and roller-element bearings. Magnetic bearings generally have lower drag losses, higher stiffness and damping properties, and moderate load capacity. In addition, unlike other types of bearings, magnetic bearings do not require lubrication, thus eliminating oil, valves, pumps, filters, coolers, and the like, that add complexity and includes the risk of process contamination.

In a typical magnetic bearing arrangement for rotor and stator assemblies, a stator comprising a plurality of electromagnetic coils surrounds a rotor shaft formed of a ferromagnetic material. Each of the electromagnetic coils, referred to as magnetic radial bearings because they radially surround the rotor, produce a magnetic field that tends to attract the rotor shaft. The rotor shaft assembly is supported by these active magnetic radial bearings inside the stator at appropriate positions about the rotor shaft. By varying the amount of current in the coils of a particular magnet, the attractive forces may be controlled so that the rotor remains centered between the magnets. Sensors in the stator surround the rotor and measure the deviation of the rotor from the centered position. A digital processor uses the signals from the sensors to determine how to adjust the currents in the magnets to center the rotor between the magnets. The cycle of detecting the shaft position, processing the data, and adjusting the currents in the coils, can occur at a rate of up to 25,000 times per second. Because the rotor "floats" in space without contact with the magnets, there is no need for lubrication of any kind.

Anti-friction bearings as well as seals may be installed at each end of the rotor shaft to support the shaft when the magnetic bearings are not energized. This avoids any contact between the rotor shaft and the stator's radial magnetic bearings. These auxiliary or "back-up" bearings are generally dry, lubricated, and remain unloaded during normal operation.

In the oil and gas industry, the rotor and stator assemblies can operate in a process gas, which can also serve as a cooling agent. The process gas typically is natural gas at pressures of about 10 bar to about 200 bar. Unfortunately, natural gas can have a high degree of contaminants. These contaminants can include corrosive agents such as hydrogen sulfide ($H_2S$), water, $CO_2$, oil, and others. In the worst case, the combination of water and $H_2S$ leads to what is called wet sour gas, a more corrosive gas. Magnetic bearings typically require cooling so as to maintain an acceptable temperature in the bearing components. Utilizing the process gas directly as the coolant provides a significant advantage in enabling a seal-less system, which eliminates the need for buffer gases (which are not generally available in upstream oil and gas applications) and enhancing safety and operability of the turbo-machinery installed. However, the cooling of the magnetic bearing assembly, and hence its use, in a process gas environment that contains the above contaminants poses a significant risk to the vulnerable components of the magnetic bearing.

The National Association of Corrosion Engineers (NACE) Standard MR0175, "Sulfide Stress Corrosion Cracking Resistant Metallic Materials for Oil Field Equipment" is a widely used standard in the oil and gas industry that specifies the proper materials, heat treat conditions, and hardness levels required to provide good service life of machinery used in sour gas environments. A NACE compliant material or component is substantially resistant to corrosion such as may occur upon exposure of a non-NACE compliant material to sour gas and/or wet sour gas. For example, NACE compliant welds generally require a post-weld heat treatment process to relieve any weld stresses that would normally contribute to the susceptibility for corrosion. Currently, there are no magnetic bearing systems used in the oil and gas industry that are fully NACE compliant.

NACE compliance is desirable because the rotor shaft assembly includes several components that could be exposed to a sour gas environment during operation. These include, among others, the rotor shaft itself, the magnetic rotor laminations about the rotor shaft, and the rotor-landing sleeves. As an example of the sensitivity to corrosive agents, it has been found that if the rotor laminations are exposed to wet sour gas they typically fail due to hydrogen embrittlement and stress-related corrosion cracking. Stress related corrosion cracking is an issue since the magnetic rotor laminations are typically manufactured as punchings that are shrunk-fit onto the rotor shaft. During operation at working speeds, these components experience relatively high mechanical stresses due to the shrink-fit stresses and radial forces imparted thereon.

Another drawback of current magnetic bearing systems used in rotor and stator assemblies relates to the steel alloys typically used in the construction of the rotor shaft and/or rotor laminations. The selection of steel compositions that are most resistant to sour gas generally have poor magnetic properties. Because of this, high electromagnetic losses on the rotor shaft occur resulting in heat loads exceeding 1.00 W/cm$^2$ (6.45 W/in$^2$). The exposure to the high temperatures from the heat loads can lower resistance of the steels to sour gas corrosion. Increasing the size of the components to minimize the heat loads is not practical in view of the costs, and foot prints associated with the larger components.

In addition to the rotor shaft and laminations, the rotor shaft assembly typically includes a rotor landing sleeve shrunk-fit onto each end of the rotor shaft. This landing sleeve engages an inner race of a roller-element backup bearing in the event of a rotor landing, during which the magnetic bearing fails and the backup bearing has to support the rotor during the subsequent shut-down procedure. Currently, the rotor landing sleeve is formed of a material that is not NACE compliant and is therefore subject to corrosion in a sour gas environment.

The magnetic bearing stator is a stationary component that provides the source of the magnetic field for levitating the rotor assembly. An air gap separates the stator from the rotor shaft. In order to maximize the magnetic field strength and the levitation force this air gap is made as small as possible while still meeting mechanical clearance requirements between the rotor shaft and the stator. The gap size is typically on the order of millimeter fractions. If the gap is increased, the coils in the stator require more current to levitate the rotor, or the diameter or axial length of the stator has to be increased, all of which increase the overall stator size. If the stator size is limited and cannot be increased, then the levitation force is reduced if the air gap is larger than required by mechanical clearances.

Current stators are either encapsulated or non-encapsulated. In the case of encapsulated stators, a stator "can" protects the stator components from the process environment. Current stator cans are generally comprised of two concentric tubes of the same material joined at the ends. This tubular can section is located in the gap between the stator and the rotor shaft. If the can material is non-magnetic then it adds an additional magnetic gap on top of the required mechanical clearance, which reduces bearing capacity. In order to maintain bearing capacity, the material of the tubular can section can be selected to be magnetic.

In current practice, the stator can sections are assembled from magnetic NACE compliant alloys (typical examples are chromium-nickel alloys with a 15-18 wt % chromium 3-5 wt % nickel and 3-5 wt % copper content such as 17-4 precipitation hardened (PH) stainless steel) and are welded together. The welds would normally require a post-weld heat treatment at temperatures in excess of 600° C. in order to be fully NACE compliant. However, due to the temperature limits of the encapsulated electric stator components and the method of current manufacture, no heat treatment is possible. Therefore, the welds are not currently NACE compliant and are subject to corrosion and failure such as from exposure to sour gas. Moreover, some components of the stator, such as sensors, as well as power and instrumentation wires, cannot be encapsulated and are exposed to the process gas environment.

Referring now to prior art FIG. 1, there is shown an exemplary turbo expander-compressor system generally designated by reference numeral 10 that includes a rotor and stator assembly having multiple magnetic bearings for supporting a rotor shaft. The system 10 includes a turbo expander 12 and compressor 14 at opposite ends of a housing 16 that encloses multiple magnetic bearings 18 for supporting rotor shaft 20.

Each magnetic bearing 18 includes a stator 22 disposed about the rotor shaft 20. The stator 22 includes stator poles, stator laminations, stator windings (not shown) arranged to provide the magnetic field. Fixed on the rotor shaft 20 are rotor laminations 24, each rotor lamination aligned with and disposed in magnetic communication with each stator 22. When appropriately energized, the stator 22 is effective to attract the rotor lamination 24 so as to provide levitation and radial placement of the rotor shaft 20. The illustrated system 10 further includes additional axial magnetic bearings 26 and 28 so as to align the rotor shaft 20 in an axial direction by acting against a magnetic rotor thrust disk 30. Roller-element backup bearings 32 are disposed at about each end of the rotor shaft and positioned to engage a rotor landing sleeve 34 disposed on the rotor shaft 16 when the magnetic bearings fail or when system 10 is in an off state. When the system 10 is configured to accommodate axial or thrust loads, the width of the sleeve 34 is increased to accommodate any axial movement.

The backup bearings 32 are typically made of roller-element bearings. In such bearings, the inner and outer races require steel alloys of high hardness (typically in excess of HRC 40 (Rockwell C-Scale Hardness)) to accomplish low wear and long bearing life. However, in steel alloys, the properties of high hardness and corrosion resistance are contradicting requirements. As a result, current races are made of high-hardness steel alloys that do not meet NACE corrosion requirements.

The system 10 further includes a plurality of sensors represented by 36 as well as power and instrumentation wires 38 in electrical communication with controller units (not shown). The sensors 36 are typically employed to sense the axial and radial discontinuities on the rotor shaft 20 such that radial and axial displacement along the shaft can be monitored via the controller unit so as to produce a desirable magnetic levitation force on the rotor shaft 20.

Prior art FIG. 2 illustrates a partial cross-sectional view of an exemplary rotor and stator assembly 50. The rotor and stator assembly 50 includes a rotor shaft assembly 52 that includes rotor laminations 54 attached to a rotor shaft 56. An encapsulated stator assembly 60 surrounds the rotor shaft assembly 50 and includes a stator frame 62, magnetic stator laminations 64 wrapped in conductive windings 66, and a stator sleeve 68. The stator sleeve 68 generally has a thickness ranging from 0.05 to 5.0 millimeters (mm). The encapsulated stator assembly 60 includes a hermetically sealed can defined by walls 70 and the stator sleeve 68, the walls 70 having a thickness of about one centimeter. The can is formed from multiple sections that are welded at various interfaces 72. These welds are not NACE compliant. Other stator components not shown are stator slots, poles, sensors, and power and instrumentation wires. An air gap 80 separates the rotor shaft assembly 52 from the stator assembly 60. In operation, the rotor shaft 56 levitates in a magnetic field produced by the stator assembly 60.

Given the increasing use of rotor and stator assembly that utilize magnetic bearing systems in corrosive environments, a growing need exists to overcome the above-described deficiencies of current magnetic bearings.

BRIEF DESCRIPTION OF THE INVENTION

Disclosed herein are corrosion resistant encapsulated magnet assemblies and processes for fabricating the same. In one embodiment, the present invention provides an encapsulated magnet assembly, comprising: (a) a magnet disposed within a housing, said housing comprising at least one wall and defining at least one aperture; and (b) a housing cover; said housing cover comprising a first portion made of a magnetic material and a second portion made of a non-magnetic material, wherein the housing cover is configured to hermetically seal said aperture, the first portion being fixedly attached to the second portion wherein a point of attachment is heat treated; and wherein the housing wall is formed of the non-magnetic material and is fixedly attached to the second portion of the housing cover.

In an alternate embodiment, the present invention provides process of forming an encapsulated magnet assembly, the process comprising: welding a second portion of a housing cover formed of a non-magnetic material to a first portion of a housing cover formed of a magnetic material to provide a welded housing cover and subsequently heat-treating the welded housing cover at a temperature effective to relieve weld stress; disposing a magnet within a housing comprising at least one wall formed of the non-magnetic material and defining at least one aperture; and welding the heat treated welded housing cover to the housing such that the second portion of the housing cover is fixedly attached to the housing wall to hermetically seal the aperture.

The features and advantages of the components and processes disclosed herein may be more readily understood by reference to the following drawings and detailed description, and the examples included therein.

BRIEF DESCRIPTION OF THE DRAWINGS

The figures below, wherein like elements are numbered alike, are for illustrative purposes.

DETAILED DESCRIPTION OF THE INVENTION

The present disclosure provides rotor and stator assemblies that include magnetic bearings and processes for assembling the magnetic bearings that are suitable for use in corrosive environments. The magnetic bearing assemblies can be made to be fully NACE compliant as may be desired for some applications. For example, NACE compliant rotor shaft assemblies were achieved by coating the magnetic steel rotor shaft and rotor laminations with a barrier film. For magnetic bearing systems employing an encapsulated stator assembly, NACE compliant stator cans were achieved using a combination of magnetic and non-magnetic materials for the encapsulation, that when welded together required heat treatment only in joints between different materials. Similarly, rotor landing sleeves, inner and outer races of backup bearings, as well as power and instrumentation wires can be made NACE compliant by the use of specific materials, which will be described in greater detail below.

A turboexpander is used as an illustrative example, but the magnetic bearings for corrosive environments disclosed herein are useful in axial bearings and other implementations of magnetic bearings; for example, pumps, compressors, motors, generators, and other turbomachinery.

Figure 1:
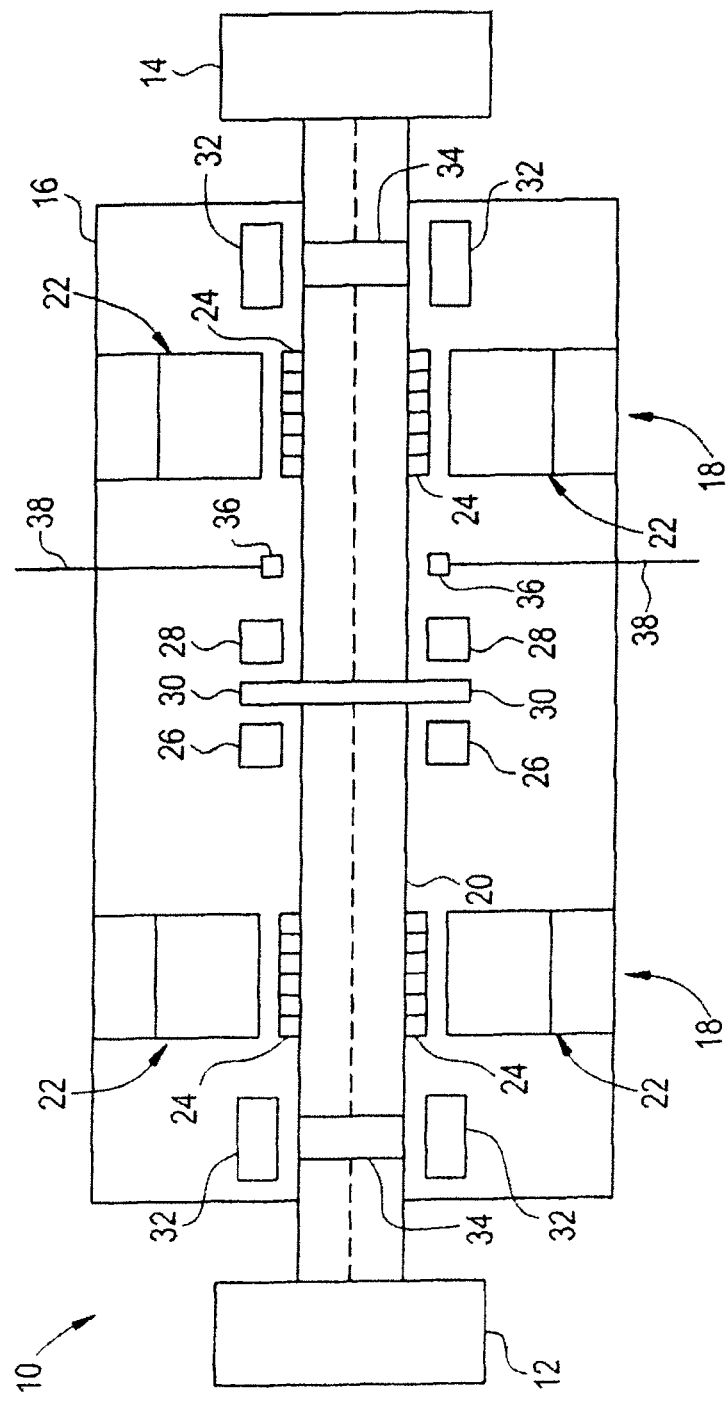
FIG. 1 is a prior art schematic of a magnetic bearing system illustrating a magnetic bearing rotor assembly and stator used for example, in an expander-compressor.
Figure 2:
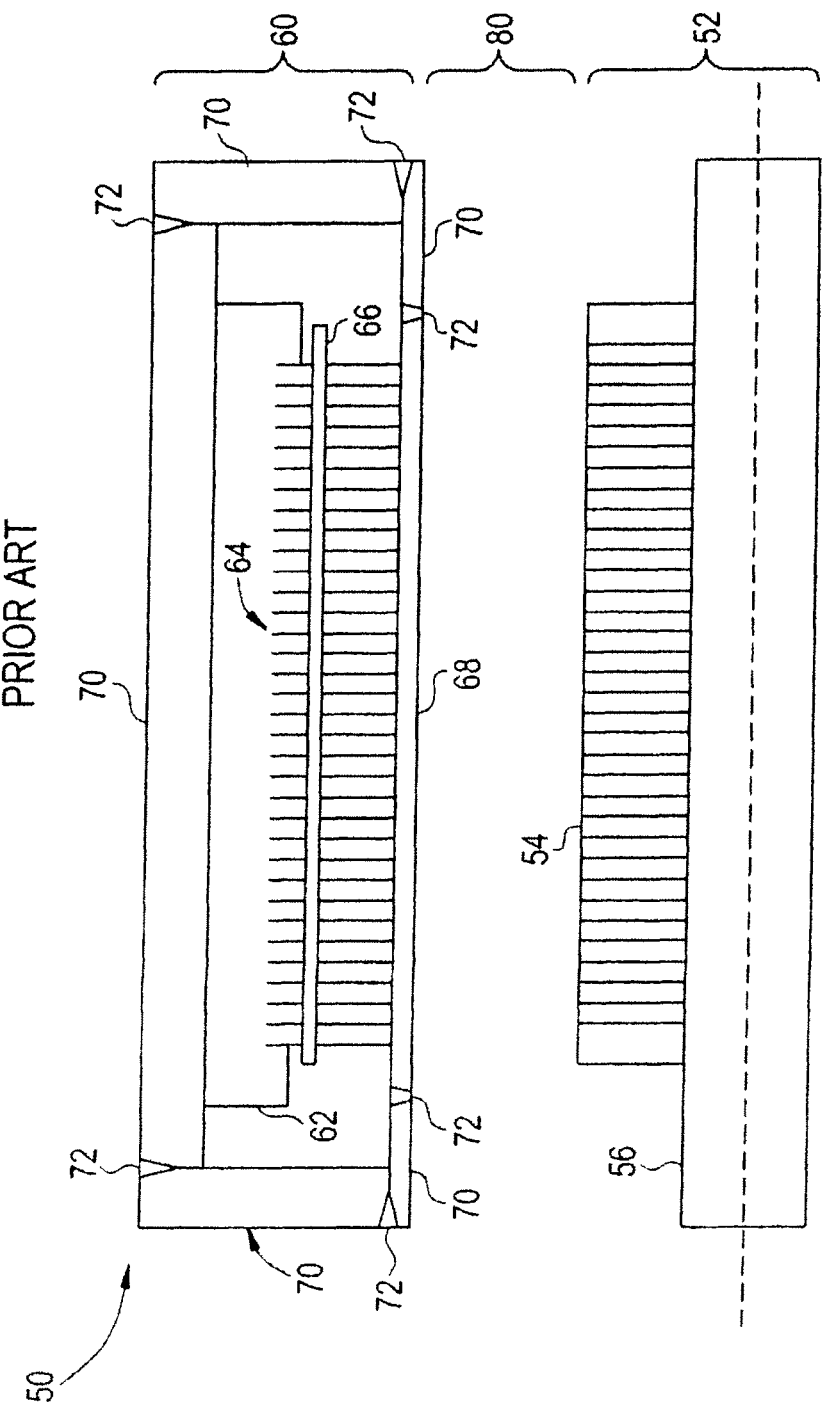
FIG. 2 is a prior art schematic of an encapsulated stator showing the stator can with NACE non-compliant welds, arranged relative to a rotor assembly.
Figure 3:
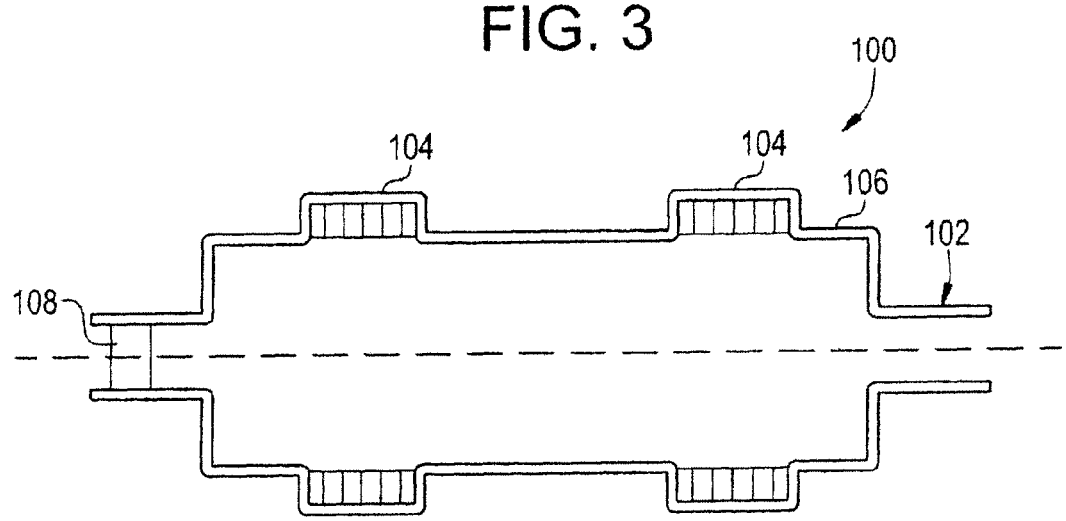
FIG. 3 is a schematic showing a rotor assembly coated with a polymer barrier layer.

FIG. 3 illustrates one embodiment for rendering the rotor assembly of magnetic bearings suitable for use in corrosive environments, such as in sour gas and wet sour gas environments. The rotor shaft assembly 100 includes a rotor shaft 102, rotor laminations 104 disposed about the shaft, and rotor landing sleeve 108. A barrier layer 106 is shown disposed on all of the exposed surfaces of the rotor shaft assembly. In an optional embodiment, the barrier layer is formed on selected surfaces of the rotor shaft assembly. For example, the barrier layer could be formed on selected areas of the rotor assembly most prone to corrosion. These include selected areas of the rotor shaft, the rotor laminations, or the punchings used to collectively form the rotor laminations. In one embodiment, the barrier layer is applied to rotors comprising laminations made from iron-silicon (FeSi) that are known to have no or only a low corrosion resistance. NACE compliant alloys such as 17-4 PH stainless steel generally do not require the polymeric surface coating because they are inherently corrosion resistant.

Optionally, a primer coat can be applied prior to application of the barrier layer. The particular thickness of the primer layer will depend on the type of barrier material selected but in general should be selected to be effective for use in the particular environment in which the magnetic bearing is disposed. It is well within the ordinary skill of those in the art to optimize the thickness of the layer based on the polymer composition and the intended application.

Suitable materials for forming the barrier layer 106 for protecting the rotor shaft assembly 100 in corrosive environments include, but are not intended to be limited to, various fully (i.e., perfluorinated) and partially fluorinated polymers. Suitable fully fluorinated polymers include polytetrafluoroethylene (PTFE), and perfluoroalkoxy-tetrafluoroethylene copolymer (PFA), fluorinated ethylene-propylene copolymer (FEP) and the like. PFA is a copolymer of tetrafluoroethylene $[CF_2{=}CF_2]$ with a perfluoralkyl vinyl ether $[F(CF_2)_n CF_2OCF{=}CF_2]$. The resultant polymer contains the carbon-fluorine backbone chain typical of PTFE with perfluoroalkoxy side chains. One particular form of PFA suitable for the barrier layer is tetrafluoroethylene-perfluoromethylvinylether copolymer (MFA). Partially fluorinated polymers include ethylene-chlorotrifluoroethylene copolymer (ECTFE), ethylene-tetrafluoroethylene copolymer (ETFE) and polyvinylidene fluoride (PVDF).

Combinations of fluoropolymers sold under the tradenames Xylan™ by Whitford Corporation, and Teflon™ and Teflon-S™ by Dupont are also useful barrier layer materials. Xylan™ coatings comprise in part PTFE, PFA, and FEP. Teflon™ coatings comprise in part PTFE, PFA, FEP, and ETFE fluorocarbon resins. Teflon-S™ is another related family of fluorocarbon coatings containing binding resins, which provide increased hardness and abrasion resistance or other desirable properties.

Other organic materials useful in forming the barrier layers include powdered epoxies, filled epoxies, filled silicones, and filled PPS (polyphenylene sulfide). Representative thermosetting epoxy powder coatings include, but are not intended to be limited to, Scotchkote™ 134 and Scotchkote™ 6258 from 3M Corporation.

Scotchkote™ 134 fusion bonded epoxy coating (FBEC) is a one part, heat-curable, thermosetting epoxy coating comprising in part di(4-hydroxyphenol) isopropylidene diglycidyl ether-di(4-hydroxyphenol) isopropylidene copolymer. Scotchkote™ 6258 fusion bonded epoxy coating (FBEC) is a one part, heat-curable, thermosetting epoxy coating comprising in part a mixture of di(4-hydroxyphenol)isopropylidene diglcycidyl ether-di(4-hydroxyphenol)isopropylidene copolymer, and epichlorohydrin-o-cresol-formaldehyde polymer. Scotchkote™ 134 and Scotchkote™ 6258 are applied as a dry powder optionally over a 25.4 micrometer (1 mil) phenolic primer coat and heat cured to a thickness of 254 to 381 micrometers (10 to 15 mil) at a temperature of 150° C. to 250° C. for up to 30 minutes.

Still other materials useful for forming the barrier layer 106 in FIG. 3 include conversion coatings of oxides, phosphates, and chromates, and more specifically, conversion materials sold under the trade names Sermalon™ Sermaloy™, Sermagard™ and Sermatel™ by Sermatech.

The Sermalon™ coating system comprises an aluminum-filled chromate/phosphate bond coat, an intermediate high temperature polymeric inhibitive coating, and a PTFE impregnated topcoat. Coating thickness ranges from 100 to 150 micrometers. SermaLoy™ is an intermetallic nickel aluminide with a silicon-enriched outer layer. Sermatel™ is a family of inorganic coatings that bond to metal creating a metal-ceramic composite. Sermagard™ is a water based aluminized coating with ceramic binder.

Thicknesses of the polymer barrier layer 106 can range from 2 micrometers to 600 micrometers (0.079 mil to 23.6 mil).

The polymer barrier layer 106 can be applied to the substrate (i.e., on all or selected surfaces of rotor assembly) in the form of a liquid dispersion or a powder, optionally over a primer layer. Liquid dispersions, comprising polymeric material in a water or solvent suspension, can be applied in a spray and bake coating process in which the liquid dispersion is sprayed onto the substrate for subsequent heating above the melting temperature of the polymeric material contained in the dispersion. Known methods of applying polymeric material in powdered form include spraying of the powder onto the substrate using an electrostatic gun, electrostatic fluidized bed, or a flocking gun, for example. In another example, the powder can be sprayed onto a substrate that has been heated above the melt temperature of the polymeric material to form a coating, also referred to as thermal spraying. It is also known to apply coatings in a process known as "rotolining" in which the substrate and powder is heated, in an oven for example, above the melt temperature of the polymeric material while the substrate is rotated to form a seamless coating on the substrate.

As previously discussed, the barrier layer 106 is applied to at least one exposed selected surface of the rotor shaft assembly 100, which can include one or more surfaces defined by the rotor laminations 104, the rotor shaft 102, the rotor landing sleeve 108, other rotor assembly surfaces or the fully assembled rotor 100. The purpose is to encapsulate portions of or the entire rotor assembly in a protective coating that inhibits corrosion, such as may occur upon exposure to sour gas.

The components of the rotor shaft assembly are typically formed of magnetic steel. In one embodiment, the rotor laminations are made of iron-silicon (FeSi) material and the polymeric barrier coating is disposed thereon.

In another embodiment, the rotor laminations are clad with a barrier layer comprising a hydrogen resistant nickel based alloy comprising 40-90 wt % (weight percent) nickel based on the total weight of the nickel based alloy. Herein, "X-Y wt %" means "X wt % to Y wt %" where X and Y are numbers. In particular, the hydrogen resistant nickel based alloy is HASTELLOY® C22® from Haynes International, comprising about 56 wt % nickel, about 2.5 wt % cobalt, about 22 wt % chromium, about 13 wt % molybdenum, about 3 wt % tungsten, about 3 wt % iron, about 0.5 wt % manganese, about 0.08 wt % silicon, about 0.35 wt % vanadium and about 0.010 wt % carbon based on total weight of the nickel based alloy.

In another embodiment, the rotor shaft is formed of a magnetic steel of type 17-4PH stainless steel alloy, a precipitation hardened martensitic stainless steel comprising 10-20 wt % chromium based on total weight of the precipitation hardened martensitic stainless steel, and further comprising copper and niobium additions. More specifically the precipitation hardened martensitic stainless steel comprises about 16.5 wt % chromium, about 4.5 wt % nickel, about 3.3 wt % copper and about 0.3 wt % niobium based on total weight of the precipitation hardened martensitic stainless steel. The use of the magnetic steel permits construction of a rotor shaft assembly having compact dimensions. The polymeric barrier layer or the optional HASTELLOY® C22® coating on the rotor laminations provides for additional resistance to corrosion such as from exposure to sour gas. However, the usage of sour gas resistant alloys such as the type 17-4PH alloy impacts the magnetic properties of the rotor compared to, for example, iron-silicon alloys (FeSi), thus increasing the electromagnetic losses. This poses a significant challenge particularly during ambient air testing of the assembled machine as required by the American Petroleum Institute. Ambient air has significantly lower pressure and therefore lower cooling capacity than a pressurized process gas. In addition, its thermal and transport properties are inferior to many process gases, further reducing its cooling capacity compared to pressurized process gas. One way to compensate for this is to increase the rotor size so as to increase the exposed area, thus reducing the rotor surface heat flux and increasing the cooling capability. However, this reduces the attractiveness of the magnetic bearing in the intended application. If the rotor dimensions are not increased, the resulting rotor could have a rotor surface heat flux in excess of 1 W/cm$^2$ (6.45 W/in$^2$). If tested in ambient air, this can easily result in excessive heat rise beyond the laminated rotor insulation material capabilities. All of these disadvantages can be avoided by testing the assembled machine in air or other gases (such as Nitrogen) at a pressure elevated enough and/or at temperature lowered enough to maintain an acceptable temperature of the bearing components. The exact combination of needed pressure and temperature is design dependent and requires knowledge of the expected rotor losses at test conditions to be properly selected. Alloys other than the 17-4PH alloy such as PERMALLOY™ of Western Electric Company and MOLY PERMALLOY™ alloy from Allegheny Ludlum Corporation, low-carbon martensitic stainless steels, or similar materials, can also be used to fabricate the rotor laminations. PERMALLOY™ and MOLY PERMALLOY™ comprise about 80 wt % nickel, about 14 wt % iron, about 4.8 wt % molybdenum, about 0.5 wt % manganese, and about 0.3 wt % silicon based on total weight of the alloy. Low carbon martensitic stainless steels comprise about 11.5-17.0 wt % chromium, about 3.5-6.0 wt % nickel, and no more than 0.060 wt % carbon based on total weight of the low carbon martensitic stainless steel.

In another embodiment, the rotor landing sleeve 108 as shown in FIG. 3 is formed of a cobalt based superalloy steel comprising 40-70 wt % cobalt based on total weight of the cobalt based superalloy steel. The use of cobalt based superalloy steels advantageously makes the rotor landing sleeve NACE compliant. More specifically, suitable cobalt based superalloy steels include, but are not intended to be limited to, cobalt based superalloy steels sold by Haynes International Corp. under the trade names ULTIMET®, comprising about 54 wt % cobalt, about 26 wt % chromium, about 9 wt % nickel, about 5 wt % molybdenum, about 3 wt % iron, about 2 wt % tungsten, about 0.8 wt % manganese, about 0.3 wt % silicon, about 0.8 wt % nitrogen, and about 0.06 wt % carbon based on the total weight of the cobalt based superalloy steel. Other suitable cobalt based superalloy steels include HAYNES™ 6B, comprising about 51 wt % cobalt, about 10 wt % nickel, about 20 wt % chromium, about 15 wt % tungsten, about 3 wt % iron, about 1.5 wt % manganese, about 0.4 wt % silicon, and about 0.10 wt % carbon based on total weight of the cobalt based superalloy steel, and chrome coatings sold by Armoloy Corporation under the trade name Armoloy®. ULTIMET® and HAYNES™ 6B alloys comprise primarily cobalt, chromium, and nickel. These cobalt based superalloys exhibit outstanding tribological characteristics that are necessary to prevent damage to the rotor shaft surface during a magnetic bearing failure when the rotor shaft is dropped onto the roller-element backup bearings, while at the same time meeting corrosion resistance requirements. In addition, there are nickel-cobalt based alloys (such as the MP35N alloy) that can be work hardened and aged to increase their hardness and thus strength and still remain NACE compliant.

Figure 5:
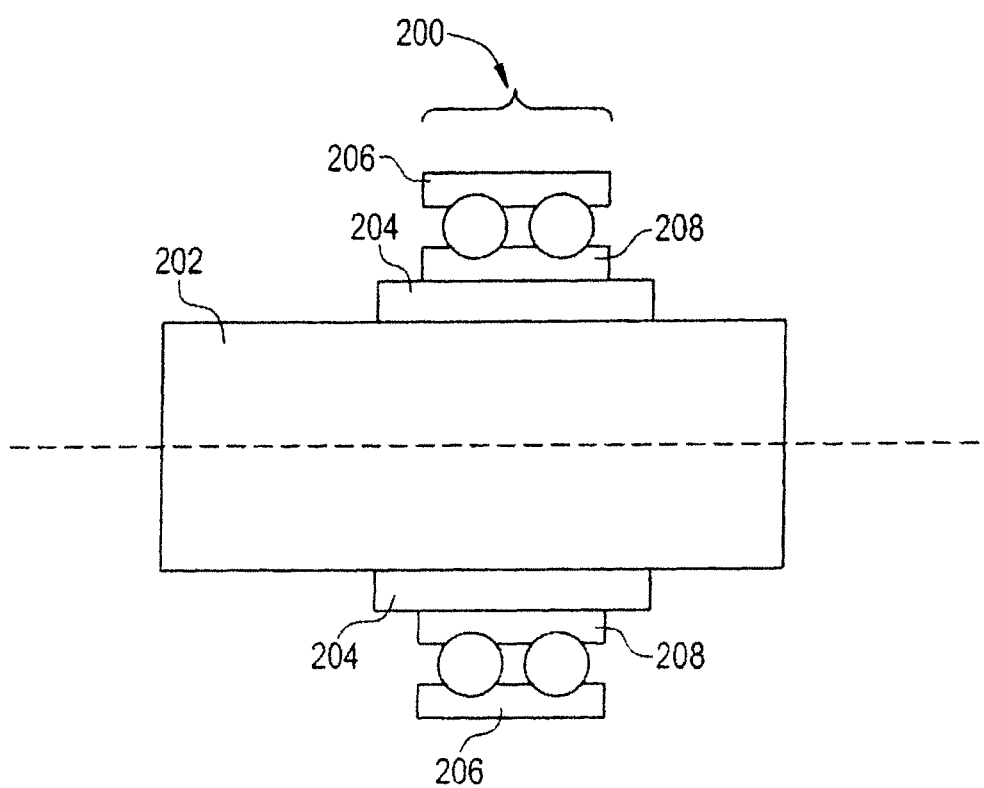
FIG. 5 is a schematic of the roller-element backup bearing disposed relative to a rotor shaft and rotor landing sleeve.

FIG. 5 shows a general schematic of a roller-element backup bearing 200 comprising inner races 208 and outer races 206 relative to rotor shaft 202 and landing sleeve 204. In another embodiment, the inner and outer races of the roller-element backup bearing are made of a martensitic nitrogen stainless steel comprising 10-20 wt % chromium and 0.1-1.0 wt % nitrogen based on total weight of the martensitic nitrogen stainless steel. Typical compositions are about 0.25 to 0.35 wt % carbon, about 0.35 to 0.45 wt % nitrogen, about 0.5 to 0.6 wt % silicon, about 14.5 to 15.5 wt % chromium, and about 0.95 to 1.05 wt % molybdenum based on the total weight of the composition. These martensitic nitrogen stainless steels are commercially available from the Barden Corporation as Cronidur-30™ or SKF Bearings USA as VC444. These martensitic nitrogen stainless steels are available in hardnesses sufficiently high for the application in roller-element backup bearing races (HRC of higher than 55) and also provide excellent corrosion resistance.

In yet another embodiment, the various stator components can be protected from corrosive gas environments by applying a barrier material to selected surfaces. These include the stator can surfaces, power and instrumentation wires, stator sensors, and stator sleeve. This is advantageous for non-encapsulated stator assemblies.

In another embodiment, test methods disclosed herein permit testing a compact magnetic bearing with a rotor surface heat flux in excess of 1 W/cm$^2$ (6.45 W/in2) in a factory environment prior to installation on site. This entails operating the bearing in the factory in a pressurized atmosphere of air or other inert gas as opposed to methane or natural gas used at an oil production site. The air or the other inert gas is pre-cooled by chillers or heat exchangers, or is optionally a cryogenic fluid that expands to a selected temperature and pressure prior to being supplied to the magnetic bearing. The temperature of the atmosphere ranges from −260° C. to 40° C. The atmosphere is pressurized to at least 2 bar to increase its heat removal capability while maintaining the rotor temperature within engineering limitations.

As previously discussed, the rotor and stator assembly can include an encapsulated stator assembly, also referred to herein as a stator can. In one embodiment, the stator can is constructed with NACE compliant materials and welds using a combination of magnetic and non-magnetic steel alloys. Magnetic steel alloys are placed in areas of the stator can where the magnetic steel provides an electromagnetic advantage, e.g., the stator sleeve. Non-magnetic steel (such as Inconel) has better corrosion resistance and does not require post-weld heat treatment and therefore it is placed in areas where magnetic steel properties are not required.

In one embodiment, the magnetic steel alloy of the encapsulated stator comprises a precipitation hardened martensitic stainless steel comprising 10-20 wt % chromium based on total weight of the precipitation hardened martensitic stainless steel. More specifically, the precipitation hardened martensitic stainless steel comprises about 16.5 wt % chromium, about 4.5 wt % nickel, about 3.3 wt % copper, and about 0.3 wt % niobium based on total weight of the precipitation hardened martensitic stainless steel.

In one embodiment, the non-magnetic material of the encapsulated stator comprises a nickel based alloy comprising 40-70% nickel based on total weight of the nickel based alloy. More specifically, the nickel based alloy comprises about 58 wt % nickel, about 21.5 wt % chromium, about 9 wt % molybdenum, and about 5 wt % iron based on total weight of the nickel based alloy.

In one embodiment, the present invention provides an encapsulated magnet assembly comprising a magnet disposed within a housing. The housing comprises at least one wall and defines at least one aperture. The encapsulated magnet assembly also includes a housing cover comprising a first portion made of a magnetic material and second portion made of a non-magnetic material. The housing cover is configured to hermetically seal the aperture. The first portion of the housing is fixedly attached to the second portion of the housing wherein a point of attachment (e.g. a weld line) is heat treated to reduce residual stresses at the point of attachment, also at times herein referred to as an interface. The housing wall is formed of the non-magnetic material and is fixedly attached to the second portion of the housing cover.

The housing may be of any shape required. For example, the housing may be a cylinder having a single wall and two circular apertures, a box having five walls and a single aperture, a cone having single wall and a single aperture, a partial cone having single wall and a single aperture, a partial cone having single wall and a two apertures, a partial sphere having a single wall and one or more apertures, or a non-ideal shape and one or more apertures. The housing cover is appropriately mated to the aperture in order to hermetically seal the aperture. In one embodiment, the housing cover constitutes a disk (mates to a cylindrical housing or a cone-shaped housing). In an alternate embodiment, the housing cover is a flat rectangle (mates to a box housing). In yet another embodiment, the housing cover is a nose cone (mates to a partial cone-shaped housing). In another embodiment, the housing cover is a partial sphere (mates to a partial sphere-shaped housing). In yet another embodiment, the housing cover is a non-ideal shape appropriately mated to an aperture having a non-ideal shape.

In one embodiment the present invention provides an encapsulated magnet assembly comprising a permanent magnet such as a ceramic composite comprising iron oxide and a ceramic matrix comprising barium carbonate and strontium carbonate. In an alternate embodiment, the present invention provides an encapsulated magnet assembly comprising an electromagnet, for example a stator which is an electromagnet.

The encapsulated magnet assembly may be used in a variety of applications, for example as a electromagnet in an electric motor. In various applications, the encapsulated magnet assemblies provided by the present invention may be configured to be stationary or rotating. For example, where the encapsulated magnet assembly provided by the present invention is used as a stator in an electric motor, the encapsulated magnet assembly is said to be configured as a non-rotating (i.e. stationary) encapsulated magnet assembly. In instances in which the encapsulated magnet assembly is mounted on a moving component of a mechanical system, for example the rotor of a compressor, the encapsulated magnet assembly is said to be configured as a rotating encapsulated magnet assembly.

The encapsulated magnet assemblies provided by the present invention are especially useful in driving magnetically susceptible rotating equipment components such as rotors. In various embodiments, the encapsulated magnet assembly may be used in conjunction with a rotor, in which embodiments the encapsulated magnet assembly serves as a stator configured to drive a magnetically susceptible rotor. This combination of an encapsulated magnet assembly provided by the present invention which is a stator, with a magnetically susceptible rotor is at times herein referred to as a stator-rotor assembly. In instances wherein the rotor being acted upon by the stator is disposed within a cavity defined at least in part by the stator, the encapsulated magnet assembly is said to be a component of an outside-in stator-rotor assembly. Alternatively, in instances wherein the stator acting upon the rotor is disposed within a cavity defined at least in part by the rotor, the encapsulated magnet assembly is said to be a component of an inside-out stator-rotor assembly.

In one embodiment, the rotor itself is not magnetically susceptible (i.e. susceptible to rotational or translational control under the influence of a magnetic field) but comprises one or more attachments which render the rotor magnetically susceptible. Thus, a non-magnetically susceptible rotor may have attached to it one or more magnetic components, for example an encapsulated magnet assembly provided by the present invention, which render the rotor magnetically susceptible. In one embodiment, the present invention provides an encapsulated magnet assembly which is a component of an "axial" stator-rotor assembly. In such an embodiment, the encapsulated magnet assembly and its magnetic compliment are arrayed in a non-parallel manner relative to the axis of the rotor, for example orthogonal to the axis of the rotor. In one embodiment the rotor comprises one or more encapsulated magnet assemblies arrayed orthogonally along the axis of the rotor and attached to it, for example as in a magnetic thrust bearing comprising a first encapsulated magnet assembly which is a permanent magnet configured as a ring attached to the rotor with the rotor at the center of its axis of rotation, and a second fixed encapsulated magnet assembly which acts as a stator arrayed orthogonal to the rotor and parallel to the first encapsulated magnet assembly. In the example above, the first encapsulated magnet assembly exemplifies the magnetic compliment of the second fixed encapsulated magnet assembly which controls translation of the rotor along the rotor axis, and serves as an example of an axial stator-rotor assembly.

In one embodiment, the present invention provides a magnetic bearing comprising one or more of the encapsulated magnet assemblies of the invention. For example the magnetic thrust bearing described above, or a magnetic bearing comprising an encapsulated magnet assembly the housing of which is configured as a sleeve made of a non-magnetic material (sleeve housing). The sleeve housing is configured to couple with a rotor shaft, the sleeve housing defining an inner cavity and an aperture. The sleeve housing comprises a magnet disposed within the inner cavity and proximate to the aperture. A housing cover comprising a first portion made of a magnetic material and a second portion made of the non-magnetic material hermetically seals the aperture, the first portion being fixedly attached to the second portion wherein a point of attachment is heat treated, and the sleeve housing is fixedly attached to the second portion of the housing cover. The magnet disposed within the inner cavity may be an electromagnet or a permanent magnet.

As noted, the present invention also provides a process of forming an encapsulated magnet assembly, the process comprising: welding a second portion of a housing cover formed of a non-magnetic material to a first portion of a housing cover formed of a magnetic material to provide a welded housing cover and subsequently heat-treating the welded housing cover at a temperature effective to relieve weld stress; disposing a magnet within a housing comprising at least one wall formed of the non-magnetic material and defining at least one aperture; and welding the heat treated welded housing cover to the housing such that the second portion of the housing cover is fixedly attached to the housing wall to hermetically seal the aperture.

As will be apparent to those of ordinary skill in the art and having read this disclosure, the magnet may be a permanent magnet or an electromagnet. A significant advantage of the process provided by the present invention is that a heat sensitive permanent or electromagnet magnet disposed within the housing need not be exposed to the high temperatures required to relieve weld stress.

Figure 4:
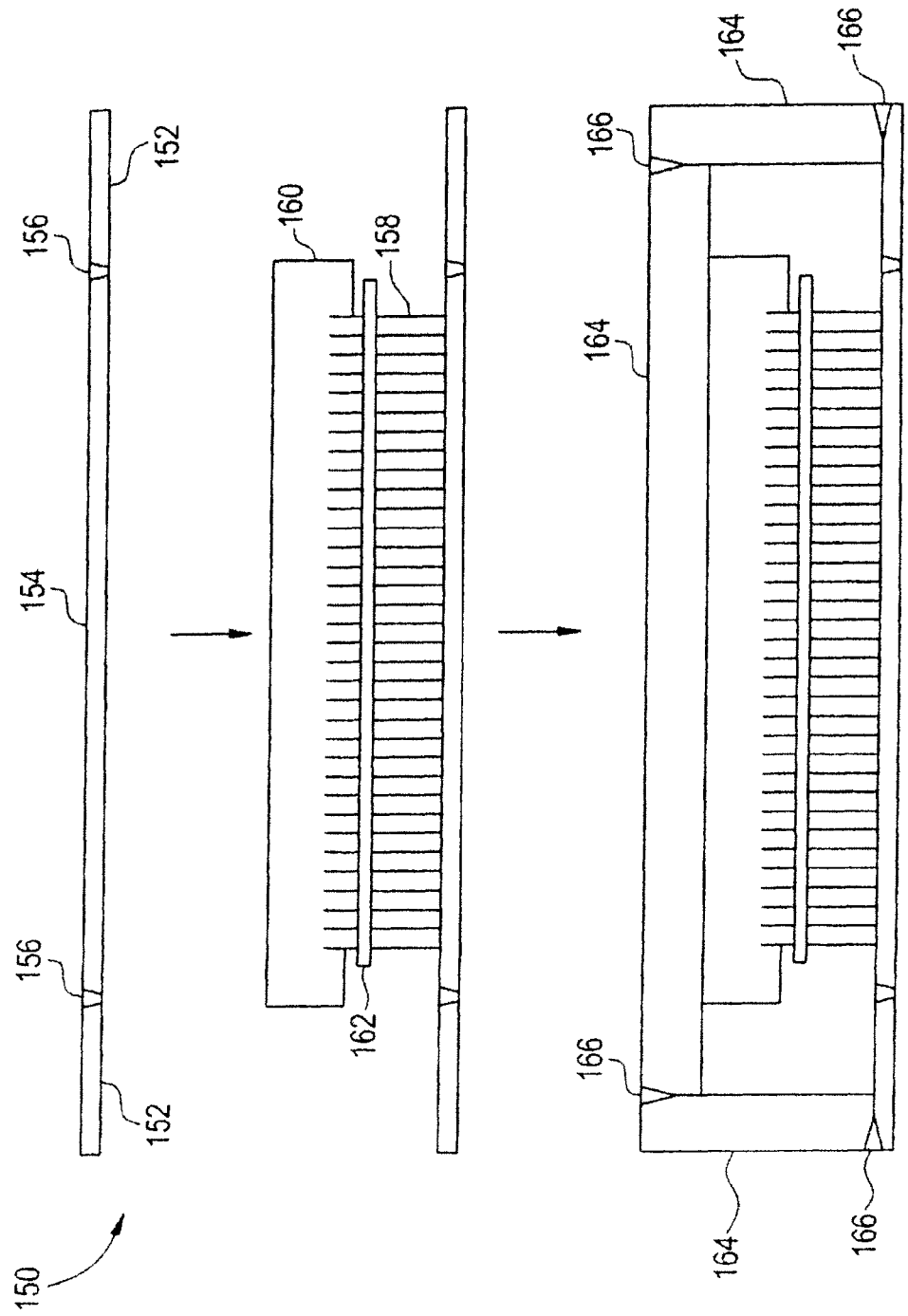
FIG. 4 is a schematic showing the steps of building one or more embodiments of the present invention.

Referring to FIG. 4, the figure schematically illustrates a process for fabricating one or more of the encapsulated magnet assemblies provided by the present invention. The process 150 includes welding a second portion 152 of a housing cover to a first portion of housing cover 154 at interface 156. By forming a composite housing cover comprising a first portion made of a magnetic material with the second portion made of a non-magnetic material prior to the disposition of any heat sensitive components upon or nearby the housing cover, a NACE compliant weld can be formed by exposing the welded composite to post-weld heat treatment that ensures low hardness (below HRC 33) of the weld area and all heat affected zones. The welds may be formed by any welding process in the art that allows post-weld heat treatment such that the weld stresses resulting from the welding of dissimilar materials are relieved. In one embodiment a hardness of less than HRC 33 in the region of the interface 156 is accomplished. Exemplary welding processes include autogenous electron beam and electron-beam with filler, laser weld, TIG weld, MIG weld, arc weld, torch weld and combinations comprising at least one of the foregoing processes.

In one or more embodiments illustrated by FIG. 4, the housing cover comprises first portion section 154 and second portion sections 152 wherein second portions 152 are joined to the edges of first portion 154 at interface 156 which defines the periphery of first portion 154. As noted, first portion 154 is made of a magnetic material and second portions 152 are made of a non-magnetic material. In one embodiment the non-magnetic material is a superalloy steel which is welded to first portion 154 that comprises a type 17-4PH magnetic steel. In one embodiment, the second portion is made of a non-magnetic superalloy steel comprising a nickel based alloy comprising 40-70% nickel based on total weight of the nickel based alloy. In another embodiment, the second portion is made of a nickel based alloy comprising Inconel 625® commercially available from Inco Alloys International, comprising about 58 wt % nickel, about 21.5 wt % chromium, and about 9 wt % molybdenum, and about 5 wt % iron. A housing cover comprising such first portions welded to such second portions may be heat-treated to form NACE compliant welds at interface 156.

A suitable post-weld heat-treatment process is a double age hardening process as per NACE MR0175 to one of the following heat cycles: 1.) solution anneal at 1040±14° C. and air cool or liquid quench to below 32° C.; followed by a first precipitation-hardening cycle at 620±14° C. for a minimum of 4 hours at temperature and air cool or liquid quench to below 32° C.; and followed by a second precipitation-hardening cycle 620±14° C. for a minimum of 4 hours at temperature and air cool or liquid quench to below 32° C.; or 2.) solution anneal at 1040±14° C. and air cool or liquid quench to below 32° C.; followed by a first precipitation-hardening cycle at 760±14° C. for a minimum of 4 hours at temperature and air cool or liquid quench to below 32° C.; followed by a second precipitation-hardening cycle 620±14° C. for a minimum of 2 hours at temperature and air cool or liquid quench to below 32° C.

In one embodiment, the encapsulated magnet assembly provided by the present invention comprises an electromagnet disposed within the housing. Thus in an embodiment illustrated in FIG. 4, the electromagnet is a stator comprising stator components such as stator frame 160 comprising magnetic stator laminations 158 embedded within conductive windings 162, attached to the heat treated welded housing cover comprising magnetic portion 154 and non-magnetic portions 152. The housing can be assembled by welding housing walls 164 to one another at interfaces 166 to complete the housing defining an aperture which is complimentary in shape to that of the housing cover. The housing walls 164 are formed of the same or similar non-magnetic material (e.g. non-magnetic steel) used in the housing cover second portion 152, such as the Inconel™ 625 superalloy steel noted above. The housing cover is engaged with the aperture such that the second portion 152 of the housing cover may be welded to the housing wall 164 at interface 166 to hermetically seal the aperture. Because the housing wall 164 and housing cover second portion 152 are made of the same or similar materials, the welds at the interfaces 166 are NACE compliant as welded and do not need a post-weld heat treatment to achieve NACE compliance. Thus, a NACE compliant encapsulated stator can be assembled without subjecting the internal stator electric components to damaging levels of heat.

Where the encapsulated magnet assembly provided by the present invention comprises an electromagnet, as in the embodiment illustrated in FIG. 4, power and instrumentation wires may be attached to the electromagnet components within the housing and communicate with power and instrumentation units located outside of the housing via electrical conduits (not shown in FIG. 4) traversing one or more of the housing walls. To provide maximum corrosion protection, the exposed portions of these power and instrumentation wires can be made NACE compliant. Thus, power and instrumentation wires in electrical communication with an electromagnet disposed within the housing may comprise a wire sleeve comprising a non-magnetic corrosion-resistant alloy surrounding an electrically conductive material. NACE compliant materials such as Inconel alloys may serve as suitable wire sleeve material. The wire sleeve encapsulates the electrical conductor which is insulated with, for example, an insulating ceramic material such as magnesium oxide (MgO) which provides excellent electric insulation under pressurized conditions.

The following examples fall within the scope of, and serve to exemplify, the more generally described methods set forth above. The examples are presented for illustrative purposes only, and are not intended to limit the scope of the invention.

Example 1

In this example, individual metal samples were powder coated with Scotchkote™ 6258 thermosetting epoxy as a barrier coating, and heat cured to a thickness of 300 micrometers and 327 micrometers. The part was preheated to a temperature of 150° C. to 246° C. before applying the powder. The powder was then cured at 177° C. for 30 minutes. These samples were tested in autoclaves with process gas to determine the suitability of the coatings in sour gas environment. A series of tests were performed in which the level of hydrogen sulfide in natural gas was varied from 6,000 parts per million (ppm) to 20,000 ppm and the level of moisture was varied from 50 ppm water to saturation. The samples were also exposed to varying temperatures from 30° C. to 130° C.

No evidence of corrosion was observed in the samples that were exposed to hydrogen sulfide, and water at temperatures below 79° C.

Example 2

In this example, small scale rotors (order of magnitude of 2 to 3 inch outer diameter) were powder coated with Scotchkote™ 134. The rotors were preheated to a temperature of 150° C. to 246° C. before the powder was applied. The powder was then cured at 177° C. for 30 minutes to a thickness of 300 micrometers to 327 micrometers. These samples were also tested in autoclaves with process gas to determine the suitability of the coatings in sour gas environment.

The samples showed no evidence of corrosion when exposed to high levels of hydrogen sulfide (6000 to 20,000 ppm), water (50 parts per million (ppm) to saturation) and 80° C.

Example 3

In this example, two full-size production rotors were coated with Sermalon™ at a thickness of 178 micrometers to 406 micrometers (7 mil to 16 mil). They were tested in the field under production conditions and passed. These production rotors were installed at site and the coating withstood the corrosive operating gas environment for in excess of 2,000 hours and prevented sour gas attack of the underlying metal components. The samples showed no evidence of corrosion.

Example 4

In this example, NACE environmental tests were performed on samples of Cronidur 30 representative of backup bearing races. The material passed standard 720 hr proof ring tests per NACE TM0177 Solution A at stress levels representative of backup bearing races without signs of corrosion.

Example 5

In this example, NACE environmental tests were performed on samples of Haynes 6-B representative of backup bearing landing sleeves. The material passed standard 720 hour proof ring tests per NACE TM0177 Solution A at stress levels representative of backup bearing landing sleeves without signs of corrosion.

Example 6

In this example, NACE environmental tests were performed on weld samples of Inconel 625 and 17-4 PH representative of the stator can welds. The material passed standard 720 hour proof ring tests per NACE TM0177 modified Solution A at stress levels representative of stator cans without signs of corrosion in the weld.

The combination of the various embodiments described above provide for a magnetic bearing having superior resistance to corrosive elements such as may be encountered in a sour gas environment.

The singular forms "a," "an," and "the" include plural referents unless the context clearly dictates otherwise. The endpoints of all ranges directed to the same characteristic or component are independently combinable and inclusive of the recited endpoint.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A process of forming an encapsulated magnet assembly, the process comprising:
    welding a second portion of a housing cover formed of a non-magnetic material to a first portion of a housing cover formed of a magnetic material to provide a welded housing cover and subsequently heat-treating the welded housing cover at a temperature effective to relieve weld stress, wherein heat-treating the welded housing cover comprises exposing the welded housing cover to a double age hardening process;
    disposing a magnet within a housing comprising at least one wall formed of the non-magnetic material and defining at least one aperture; and
    welding the heat treated welded housing cover to the housing such that the second portion of the housing cover is fixedly attached to the housing wall to hermetically seal the aperture.

2. The process according to claim 1, wherein the magnet is a permanent magnet.

3. The process according to claim 1, wherein the magnet is an electromagnet.

4. The process according to claim 1, wherein said disposing a magnet within the housing comprises attaching electromagnetic components of an electromagnet to the first portion of the heat treated welded housing cover.

5. The process of claim 1, wherein the magnetic material comprises a precipitation hardened martensitic stainless steel comprising 10 to 20 wt % chromium based on a total weight of the precipitation hardened martensitic stainless steel.

6. The process of claim 1, wherein the non-magnetic material comprises a nickel based alloy comprising 40 to 70 wt % nickel based on a total weight of the nickel based alloy.

7. The process of claim 1, wherein welding a second portion of a housing cover formed of a non-magnetic material to a first portion of a housing cover formed of a magnetic material to provide a welded housing cover comprises an autogenous electron beam process, a laser weld process, a TIG weld process, a MIG weld process, an arc weld process, a torch weld process or combinations comprising at least one of the foregoing processes.

8. The process of claim 1, wherein welding a second portion of a housing cover formed of a non-magnetic material to a first portion of a housing cover formed of a magnetic material to provide a welded housing cover comprises a laser weld process.

9. The process of claim 1, wherein heat-treating the welded housing cover comprises solution annealing at an elevated temperature and subsequently cooling to below 32° C.; followed by at least one precipitation-hardening cycle.

10. The process according to claim 1, wherein the encapsulated magnet assembly is a stator configured to drive a magnetically susceptible rotor.

* * * * *